April 29, 1941. W. BADER 2,240,028

LUMINOUS MARK MEASURING ARRANGEMENT

Filed Nov. 24, 1937 2 Sheets-Sheet 1

Wilhelm Bader
Inventor

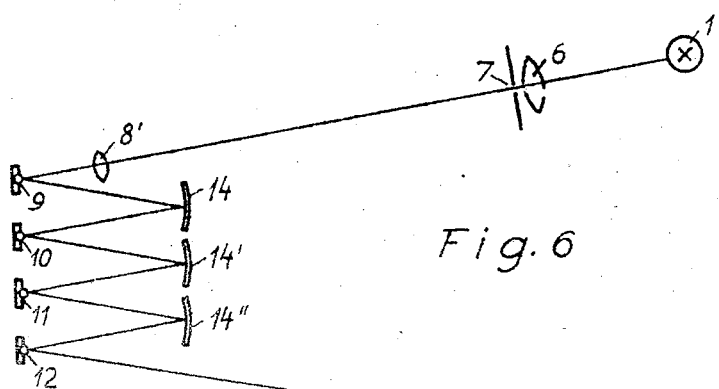
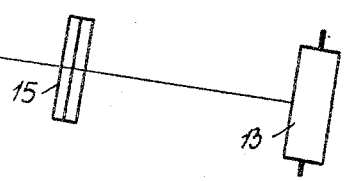
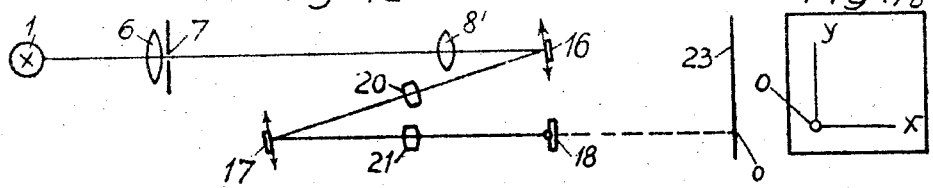
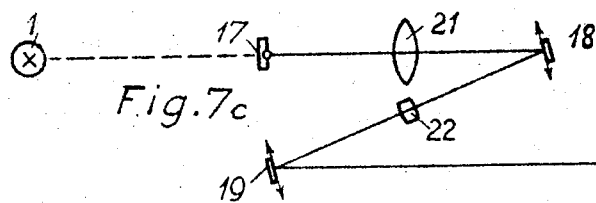
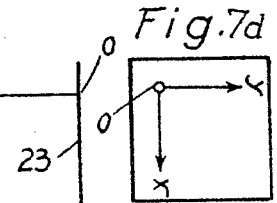
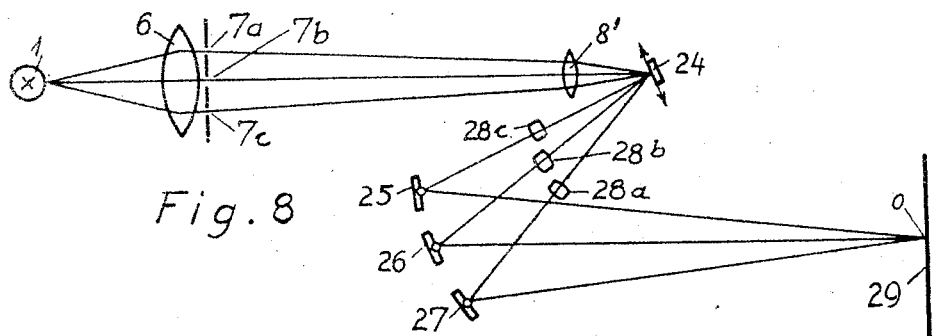

Patented Apr. 29, 1941

2,240,028

UNITED STATES PATENT OFFICE 2,240,028

LUMINOUS MARK MEASURING ARRANGEMENT

Wilhelm Bader, Berlin-Charlottenburg, Germany, assignor to Siemens & Halske, Aktiengesellschaft, Siemensstadt, near Berlin, Germany, a corporation of Germany Application November 24, 1937, Serial No. 176,162
In Germany November 26, 1936

9 Claims. (Cl. 88—24)

The present invention relates to improvements in luminous mark measuring arrangements for recording the relationship between a plurality of magnitudes to be measured.

Arrangements are known in the art in which the relationship between a plurality of magnitudes to be measured are made evident by coordinating corresponding measuring mechanisms provided with mirrors to the individual magnitudes to be measured and by directing a beam of light coming from a light source through the mirrors of the measuring mechanism. In this case an image of a fixed diaphragm aperture, illuminated by the light source, is preferably projected onto a screen. If the relationship between the magnitudes to be measured is to be recorded a photographic film may be employed as a screen.

My invention is illustrated in the accompanying drawings in which

Fig. 1 represents an explanatory diagram.

Fig. 2 diagrammatically illustrates the effect of interposing a positive lens between two measuring mirrors according to the invention.

Fig. 6 shows an arrangement, similar to Fig. 5, in which hollow spherical mirrors are employed in place of inverting lenses.

Figure 1:
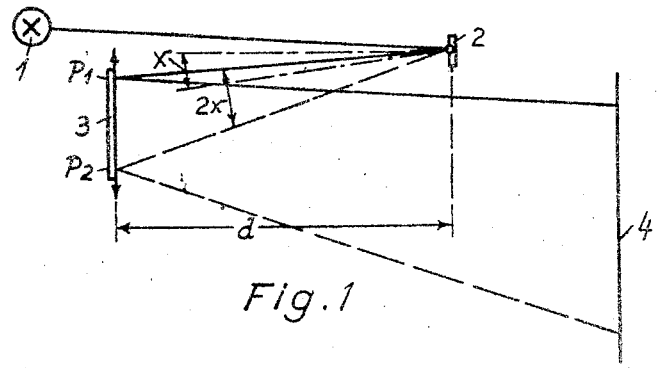

Figs. 7a–7d show diagrammatically arrangements by which certain functional relations of a plurality of magnitudes can be reproduced on the screen by mirror and lens systems, Fig. 7a representing an elevation and Fig. 7c a plan view of the system, and Fig. 8 shows diagrammatically an arrangement by which the relationship between several magnitudes and a common reference magnitude can be reproduced on a screen.

In order to continuously record on a film, for instance, the sum of two magnitudes to be measured, two corresponding measuring instruments provided with mirrors may be employed whose axes of rotation lie parallel to each other. If now the film is moved by a clockwork the curve obtained represents the function $y_1+y_2=f(t)$, where $y_1$ and $y_2$ are the corresponding magnitudes to be measured and $t$ the time. A similar arrangement may, however, be also employed to represent the relationship between a magnitude $y$ to be measured and a magnitude $x$ (reference magnitude). If the graphic representation is to be carried out according to a rectangular system of coordinates both measuring mechanisms corresponding to the magnitudes to be measured $x$ and $y$ are so arranged that their axes of rotation are substantially at right angles to one another. The image of a diaphragm aperture in the form of a spot projected onto a screen by the beam of light reflected by both mirrors moves in such a manner that it records a curve $y=f(x)$.

The known arrangements have, however, the drawback that the conditions are very unfavorable if the measuring mechanism mirrors cannot be arranged very close to each other. For instance, in the case of the arrangement chosen in the explanatory diagram Fig. 1 the main ray of a light beam coming from a light source 1 strikes a screen 4 through two measuring mechanism mirrors 2 and 3 of which mirror 2 rotates on an axis at right angles to the drawing surface and mirror 3 rotates on an axis located in the plane of the drawing surface. The incident beam in the position of rest of the measuring mechanism mirror 2 is so reflected by the latter that it strikes the mirror 3 at a point $P_1$. Under these conditions and in case of deflection of the mirror 2 by an angle 4 corresponding to the magnitude to be measured, the beam will strike the mirror 3 at a point $P_2$ which is the more distant from $P_1$ the greater the angle $x$ and the greater the distance $d$ between the mirrors. Since the distance $d$ depends, as a rule, upon the dimensions of the corresponding measuring mechanism, the mirror 3 of the second measuring mechanism even in the case of a small angle $x$ of deflection must be relatively very large, particularly in the direction of its rotation axis $a$. In this manner the moment of inertia and the weight of the corresponding measuring mechanism is increased in most cases in an undue manner. Consequently, it has hitherto been, for instance, impossible to design such an arrangement for cooperation with oscillograph loops in which only extremely small dimensions of the mirrors are permissible. The difficulties are still greater if the light beam is caused to be reflected by more than two measuring mechanism mirrors.

These drawbacks are removed according to the invention by arranging between each pair of measuring mechanism mirrors an optical system which projects one measuring mechanism mirror onto the other. If the light beam is caused to be reflected by more than two mirrors such an optical system which may consist of lenses or hollow mirrors is to be arranged between two adjacent measuring mechanism mirrors. In this manner the main ray of the light beam reflected by the first measuring mechanism mirror is always reflected again on the same point of the second measuring mechanism mirror even after the rotation of the first measuring mechanism mirror so that very small dimensions are sufficient for all measuring mechanism mirrors.

It is particularly advantageous if the optical system is arranged between the measuring mechanism mirrors in such a manner that the angle at which the main beam leaves the optical system is equal to the angle of incidence. If a hollow mirror is employed as an optical system this condition is met with if the hollow mirror is distant an equal amount from both measuring mechanism mirrors. Also when using a positive lens the latter must be arranged midway between both measuring mechanism mirrors. In this manner the angles of inclination of the main ray on both measuring mechanism mirrors are always of the same magnitude and therefore the angular paths of all measuring mechanism mirrors have the same length of the light spot, corresponding to the distance l of the screen from the last measuring mechanism mirror, i. e., the same optical sensitiveness in the record.

Figure 2:
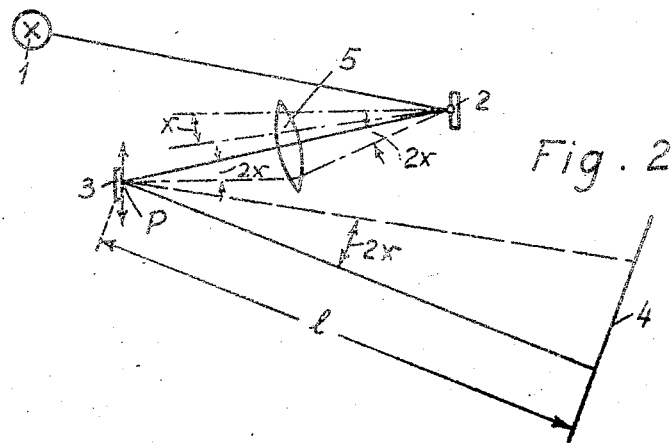

This case is shown in Fig. 2 in which the main beam is projected from the light source 1 onto a screen 4 through the measuring mechanism mirrors 2 and 3 rotatably disposed similar to mirrors 2 and 3 of Fig. 1. Midway between mirrors 2 and 3 is placed a positive lens 5 of such a focal length that the center of the mirror 2 is always projected onto the center of the mirror 3. If now the mirror 2 is rotated through angle $x$, the main beam deflected by an angle $2x$ strikes the lens 5 and is projected by the latter onto the same point P of the mirror 3 under the same angle $2x$ and upon being reflected by the latter mirror on the screen 4 is reflected again at the same angle $2x$. If now the mirror 3 is, for instance, deflected by an angle $y$ under the influence of the corresponding magnitude to be measured, the main beam is further deflected perpendicularly to the plane of the drawing by an angle $2y$ so that upon the simultaneous movement of both measuring mechanism mirrors the light point records on the screen 4 a curve which corresponds to the function $y=f(x)$. Since in this case both mirror surfaces may be chosen very small, standard oscillograph loops may be employed as measuring mechanisms and in this manner the relationship between two magnitudes varying very rapidly may be recorded.

If the instantaneous values of various magnitudes to be measured should be added together and the variations with respect to time of the sums thus obtained recorded, substantially the same arrangement may be employed, in which case, however, all measuring mechanisms are to be arranged with their axes of rotation in parallel.

In order to produce a sharp image on the screen 4 of a diaphragm aperture illuminated by a light source 1, a positive lens may be arranged between the second mechanism mirror 3 and the screen 4 in such manner that the positive lens will project a real image of the screen 4 between the focus of the optical system 5 nearest the screen 4 and the measuring mechanism mirror 3, which image corresponds to the image of the diaphragm projected by the optical system 5.

Figure 3:
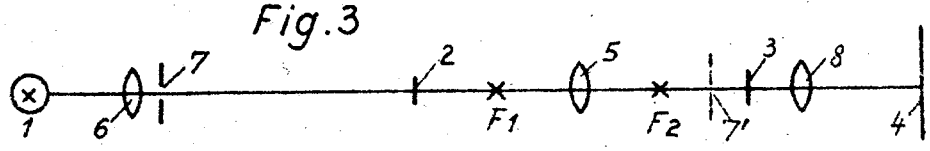
Figs. 3 and 4 are modifications of Fig. 2 showing the use of an inverting lens.

Such an arrangement is shown in Fig. 3 for the clearness of illustration with the main beam stretched out in a straight line. The arrangement corresponds to that shown in Fig. 2, except that between the light source 1 and the measuring mechanism mirror 2 are placed a condenser lens 6 and a diaphragm 7. Furthermore, a positive lens 8 is placed between the measuring mechanism mirror 3 and the screen 4. The focuses of the "inverting lens" 5 are denoted by $F_1$ and $F_2$.

If the path of beam is traced backwards from the screen 4 the lens 8 is so dimensioned and arranged that it would produce a real image of the screen 4 in a plane 7' between $F_2$ and 3. However, the diaphragm 7 is so arranged that the inverting lens 5 projects an image of the diaphragm 7 onto the same plane 7' so that the image of the diaphragm, as above described, is projected onto the screen 4.

Another possibility which offers advantages in some cases consists in arranging between the diaphragm and the first measuring mechanism mirror 2 a positive lens which produces an image of the diaphragm between the measuring mechanism 2 and the focus of the optical system 5 nearest the light source, which image is again projected onto the screen 4 by the optical system 5.

Figure 4:
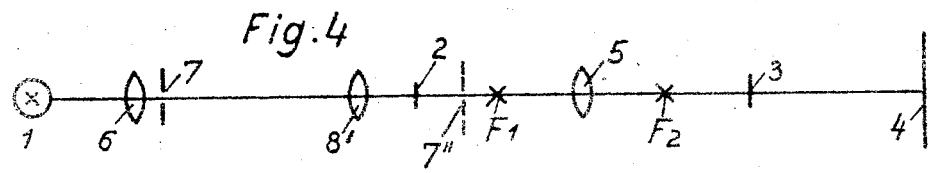

Such an arrangement is shown in Fig. 4, the main beam being also here shown as extending in a straight line. Here a positive lens 8' is arranged in front of the measuring mechanism mirror 2 in such a manner that it projects an image of the diaphragm 7 onto a plane 7'' between the mirror 2 and the focus $F_1$ of lens 8', which image is then projected onto the screen 4 by the lens 5. If the diaphragm aperture 7 is to be illuminated by a condenser lens 6 the latter is preferably so dimensioned and arranged that the light source 1 is projected onto the first measuring mechanism mirror 2. In an arrangement as shown in Fig. 4 this is accomplished with the aid of the lens 8'.

Figure 5:
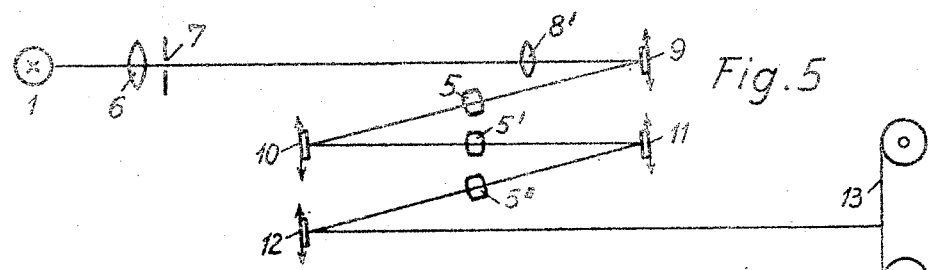
Fig. 5 shows diagrammatically an arrangement for producing on the screen the sum of several rapidly varying magnitudes with the aid of a plurality of inverting lenses.

If the sum of several rapidly varying magnitudes to be measured is to be recorded in accordance with time with the aid of oscillograph measuring mechanisms the arrangement schematically shown in Fig. 5 may, for instance, be employed. In this case it is assumed that the deflections of four oscillograph loops 9, 10, 11, 12 are added together whose axes of rotation, as illustrated by the double head arrows, lie in the plane of the drawing. The main beam emanating from the light source 1 falls on the first oscillograph mirror 9 through the condenser lens 6, the diaphragm aperture 7 and the lens 8', then on the second oscillograph mirror 10 through an inverting lens 5, on the third oscillograph mirror 11 through another inverting lens 5', and on the fourth mirror 12 through the inverting lens 5'' from which mirror it is projected onto a moving film 13.

In general, it is preferable to maintain the angles of reflection of the measuring mechanism mirrors as small as possible. It is therefore desirable as illustrated in Fig. 5 to use in such a case only lens segments 5, 5', 5'' . . . whose width, perpendicular to the direction of deflection of the light spot, is suitably chosen.

With respect to the usual arrangement of the measuring loops in the case of multiple loop oscillographs, the construction shown in Fig. 6 is, however, more advantageous in which instead of the inverting lenses spherical hollow mirrors 14, 14', 14'' are employed as optical systems. These mirrors are so arranged that a hollow mirror is opposite to every two adjacent measuring mechanism mirrors at a distance corresponding to the radius of curvature thereof. For instance, the center of the measuring mechanism mirror 9 is therefore projected onto the center of the measuring mechanism mirror 10 through the hollow mirror 14 etc. In this case the arrangement usual in oscillographs may also be employed, in which the diaphragm 7 is designed as a slit diaphragm, and the image obtained is concentrated to a point on the photographic film 13 by a cylindrical lens 15.

With an arrangement as shown in Figs. 5 and 6, for instance, the periodical variations of the instantaneous energy value of a three-phase alternating current system may be recorded with the aid of three oscillograph mirrors which are controlled by wattmetric measuring mechanisms for the three phases. In the case of three-phase current systems without neutral wire even two wattmetric oscillograph loops are sufficient in the known two wattmeter connection.

Figs. 7a to 7d illustrate a function $a=f(x)$ in a rectangular system of axes, where $x=x_1+x_2$ and $y=y_1+y_2$. For the determination of the magnitudes to be measured $x_1$, $x_2$, $y_1$, $y_2$ the measuring mechanisms 16, 17, 18, 19 are employed which carry mirrors correspondingly denoted. The sum $x_1+x_2$ is formed by the measuring mechanisms 16 and 17, for instance, with vertical axis of rotation and the sum $y_1+y_2$ by the measuring mechanisms 18 and 19 with horizontal axis of rotation. In the drawings Fig. 7a is to be considered as an elevational view and Fig. 7c as a plan view. In this case for clearness of illustration the measuring mechanism mirror 19 in Fig. 7a and the measuring mechanism mirror 16 in Fig. 7c are not shown.

The main beam coming from the light source 1 passes through the lens 6, the diaphragm aperture 7 and the lens 8' to the mirror 16 and then at first in a perpendicular plane through a lens segment 20, the mirror 17 and a lens segment 21 to the mirror 18 and then in a horizontal plane through a lens segment 22 in Fig. 7c and the mirror 19 to the screen 23 striking the latter in point 0 (see Figs. 7b, 7d), provided that all mirrors are in zero position. If $x_1$ and $x_2$ denote the deflections of the mirrors 16 and 17 respectively and $y_1$, $y_2$ those of the mirrors 18 and 19, the light spot reflected by the mirror 19 is deflected in accordance with the sum $x=x_1+x_2$ in the horizontal direction and in accordance with the sum $y=y_1+y_2$ in the vertical direction so that a curve $y=f(x)$ results on the screen 23 represented in the corresponding projection in Figs. 7b and 7d. Each magnitude $x$ or $y$ may, of course, be also represented as a sum of any number of values by a corresponding number of measuring mechanisms.

Fig. 8 shows an arrangement in diagrammatic form which may be employed to represent at the same time the relationship between various magnitudes to be measured $y_1$, $y_2$, $y_3$ ... and a common reference magnitude $x$. To this end, a measuring mechanism mirror 24 controlled by the reference magnitude $x$ and having, for instance, an axis of rotation lying in the plane of the drawing is provided as well as three measuring mechanism mirrors 25, 26, 27 responsive to the magnitudes $y_1$, $y_2$, $y_3$ and having axes of rotation perpendicular to the plane of the drawing. In order to provide a special light spot for each of these measuring mechanisms three diaphragm apertures 7a, 7b, 7c are arranged side by side behind the condenser lens 6 so that three separate light beams result whose main rays are concentrated on the measuring mechanism mirror 24 through the lens 8'. The rays are so reflected from the mirror 24 that the ray passing through the diaphragm 7c strikes the measuring mechanism mirror 25 through a lens segment 28c, the ray passing through the diaphragm 7b the measuring mechanism mirror 26 through a lens segment 28b and the ray passing through the diaphragm 7a strikes the measuring mechanism mirror 27 through a lens segment 28a. The mirrors 25, 26, 27 are preferably so arranged that the three light spots produce luminous points on the screen 29 which are concentrated to a point 0 provided that all measuring mechanism mirrors be in the zero position. If the reference magnitude $x$ changes, the luminous points wander on the screen 29 perpendicular to the plane of the drawing, whereas the deviation of the measuring mechanism mirrors 25, 26, 27 causes them to wander in the plane of the drawing in accordance with the magnitudes to be measured $y_1$, $y_2$, $y_3$. Consequently, the curves are produced on the screen 29 corresponding to the functions $$y_1=f_1(x)$$
$$y_2=f_2(x)$$
and $$y_3=f_3(x)$$

In this manner it is possible to photographically record in the same system of coordinates on a light-sensitive layer, for instance, by means of corresponding oscillograph loops at the same time the relationship between any number of magnitudes to be measured and a reference magnitude.

In a similar manner any number of values $y_1$, $y_2$ ... which are again composed of the sums $y_1=y_{11}+y_{12}+ \ldots$ and $y_2=y_{21}+y_{22}+ \ldots$ of other magnitudes to be measured may be represented in accordance with a reference magnitude $x$. Reversely, the relationship between any number of magnitudes $y_1$, $y_2$ ... and a reference magnitude $x$ may be represented which is again formed of the sum $x=x_1+x_2+ \ldots$ of a number of magnitudes to be measured. In general, the simultaneous representation of various functions of the form $$y_{11}+y_{12}+ \ldots =f_1(x_1+x_2+ \ldots)$$
$$y_{21}+y_{22}+ \ldots =f_2(x_1+x_2+ \ldots)$$

etc., is therefore also possible.

What is claimed is:

1. Means for producing a graph by a luminous spot for recording the relationship between several varying operating forces, comprising a light beam source, a diaphragm illuminated by said beam, a screen spaced from said source, at least two movable mirrors, each controllable in its movements by one of said forces and shaped and disposed to reflect said beam from one mirror onto the other and onto said screen, and means for producing on the screen an image of said diaphragm, said means comprising in optical alignment an optical converging means and between said pair of mirrors an optical system focused to project the image of one of said mirrors onto the other and both being positioned between the diaphragm and the screen, whereby the beam reflected by one movable mirror is always focused onto the same point of the next movable mirror irrespective of the angle—within the optical range of the system—through which the first-named mirror has been deflected, and whereby the track of the diaphragm image produced on said screen graphically represents the resultant function of said forces.

2. Means for producing a graph by a luminous spot for recording the relationship between several varying operating forces, comprising a light beam source, a diaphragm illuminated by said beam, a screen spaced from said source, at least two movable mirrors, each controllable in its movements by one of said forces and shaped and disposed to reflect said beam from one mirror onto the other and onto said screen, and means for producing on the screen an image of said diaphragm, said means comprising in optical alignment a positive lens means and midway in the beam path between said mirrors a hollow mirror designed and focused to project the image of one of said force operated mirrors onto the other and both being positioned between said diaphragm and said screen, whereby the beam reflected by one movable mirror is always focused onto the same point of the next movable mirror irrespective of the angle—within the optical range of the system—through which the first-named mirror has been deflected, and whereby the track of the diaphragm image produced on said screen graphically represents the resultant function of said forces.

3. Means for producing a graph by a luminous spot for recording the relationship between several varying operating forces, comprising a light beam source, a diaphragm illuminated by said beam, a screen spaced from said source, at least two movable mirrors, each controllable in its movements by one of said forces and shaped and disposed to reflect said beam from one mirror onto the other and onto said screen, and means for producing on the screen an image of said diaphragm, said means comprising in optical alignment an optical converging means and midway in the beam path between said mirrors another optical converging means designed and focused to project the image of one of said mirrors onto the other, said two converging means being positioned between said diaphragm and said screen, whereby the beam reflected by one movable mirror is always focused onto the same point of the next movable mirror irrespective of the angle—within the optical range of the system—through which the first-named mirror has been deflected, and whereby the track of the diaphragm image produced on said screen graphically represents the resultant function of said forces.

4. Means for producing a graph by a luminous spot for recording the relationship between several varying operating forces, comprising a light beam source, a diaphragm illuminated by said beam, a screen spaced from said source, at least two movable mirrors, each controllable in its movements by one of said forces and shaped and disposed to reflect said beam from one mirror onto the other and onto said screen, and means for producing on the screen an image of said diaphragm, comprising between said pair of mirrors an optical system focused to project the image of one of said mirrors onto the other, and optical converging means disposed between said screen and said mirror nearest said screen, said converging means being focused to project a real image of said screen onto a plane between said latter mirror and the focal point of said optical system near said screen, said plane corresponding to that of the image of said diaphragm produced by said optical system, whereby the beam reflected by one movable mirror is always focused onto the same point of the next movable mirror irrespective of the angle—within the optical range of the system—through which the first-named mirror has been deflected, and whereby the track of the diaphragm image produced on said screen graphically represents the resultant function of said forces.

5. Means for producing a graph by a luminous spot for recording the relationship between several varying operating forces, comprising a light beam source, a diaphragm illuminated by said beam, a screen spaced from said source, at least two movable mirrors, each controllable in its movements by one of said forces and shaped and disposed to reflect said beam from one mirror onto the other and onto said screen, and means for producing on the screen an image of said diaphragm, comprising between said pair of mirrors an optical system focused to project the image of one of said mirrors onto the other, and a positive lens disposed between said diaphragm and the first movable mirror and focused to project an image of said diaphragm at a point between said first mirror and the focal point of said optical system nearest the light beam source, of which diaphragm image an image is projected onto said screen by said optical system, whereby the beam reflected by one movable mirror is always focused onto the same point of the next movable mirror irrespective of the angle—within the optical range of the system—through which the first-named mirror has been deflected, and whereby the track of the diaphragm image produced on said screen graphically represents the resultant function of said forces.

6. Means for producing a graph by a luminous spot for graphically summing up the instantaneous values of a plurality of operating forces, comprising a light beam source, a diaphragm illuminated by said beam, a screen spaced from said source, a plurality of oscillatable mirrors, each connected to respond to the reactions of one of said forces, said mirrors having their oscillating axes in parallel to one another and being disposed in the path of said beam to reflect the diaphragm onto said screen, means for producing on said screen an image of said diaphragm, comprising in optical alignment an optical converging means, and an optical system disposed midway between each pair of adjacent mirrors and focused to project the image of one mirror onto the other, whereby the beam reflected by one movable mirror is always focused onto the same point of the next movable mirror irrespective of the angle—within the optical range of the system—through which the first-named mirror has been deflected, and whereby the track of the diaphragm image produced on said screen graphically represents the sum of the individual values of said forces.

7. Means for producing a graph by a luminous spot for graphically summing up the instantaneous values of a plurality of operating forces, comprising a light beam source, a diaphragm illuminated by said beam, a screen spaced from said source, a plurality of oscillatable mirrors, each connected to respond to the reactions of one of said forces, said mirrors having their oscillating axes in parallel to one another and being disposed in the path of said beam to reflect the diaphragm onto said screen, means for producing on said screen an image of said diaphragm, comprising in optical alignment a positive lens means and another positive lens means disposed midway between each pair of successive mirrors and focused to project the image of one mirror onto the other, whereby the beam reflected by one movable mirror is always focused onto the same point of the next movable mirror irrespective of the angle—within the optical range of the system—through which the first-named mirror has been deflected, and whereby the track of the diaphragm image produced on said screen graphically represents the sum of the values of said forces.

8. Means for producing a graph by a luminous spot for graphically summing up the instantaneous values of a plurality of operating forces, comprising a light beam source, a diaphragm illuminated by said beam, a screen spaced from said source, a plurality of oscillatable mirrors, each connected to respond to the reactions of one of said forces, said mirrors being arranged side by side and all having their oscillating axes in parallel, means for producing on said screen an image of said diaphragm, comprising in optical alignment a positive lens means, and a hollow mirror disposed opposite each pair of successive mirrors at a distance corresponding to the curvature radius of the mirror to project the image of one mirror onto the other, said screen being disposed to receive the reflection from the last mirror, whereby the beam reflected by one movable mirror is always focused onto the same point of the next movable mirror irrespective of the angle—within the optical range of the system—through which the first-named mirror has been deflected, and whereby the diaphragm is projected onto said screen and its track graphically represents the sum of the individual values of said forces.

9. Means for producing a graph by a luminous spot for graphically representing the relationship between at least one reference force and a plurality of forces to be investigated, comprising a light beam source, a diaphragm illuminated by said beam, a screen spaced from said source, an oscillatable mirror for each force disposed to be actuated thereby, said mirrors being arranged so that said diaphragm is reflected through said mirrors onto said screen, the oscillating axes of the mirrors for each kind of force being disposed in parallel relation to one another and being disposed substantially at right angles to the mirror axes for the other kind of force, means for producing on said screen an image of said diaphragm, comprising in optical alignment a positive lens means, and an optical system disposed midway between each pair of mirrors successively passed by said beam and focused to project the image of one of said mirrors onto the other, whereby the beam reflected by one movable mirror is always focused onto the same point of the next movable mirror irrespective of the angle—within the optical range of the system—through which the first-named mirror has been deflected, and whereby the track of the diaphragm image produced on said screen graphically represents the relation between the investigated forces and the reference force.

WILHELM BADER.